(12) United States Patent
Jagannathan et al.

(10) Patent No.: US 10,120,083 B2
(45) Date of Patent: Nov. 6, 2018

(54) RADIATION SENSING THERMOPLASTIC COMPOSITE PANELS

(71) Applicant: Carestream Dental Technology Topco Limited, London (GB)

(72) Inventors: Seshadri Jagannathan, Rochester, NY (US); Chang-Ying Joseph Yang, Kelowna (CA); Kevin L. Bishop, Rochester, NY (US); Mark S. Purdum, Ontario, NY (US)

(73) Assignee: Carestream Dental Technology Topco Limited, London (GB)

( * ) Notice: Subject to any disclaimer, the term of this patent is extended or adjusted under 35 U.S.C. 154(b) by 201 days.

(21) Appl. No.: 14/289,970

(22) Filed: May 29, 2014

(65) Prior Publication Data

US 2014/0291528 A1 Oct. 2, 2014

Related U.S. Application Data

(63) Continuation-in-part of application No. 13/170,622, filed on Jun. 28, 2011, now Pat. No. 8,766,196.

(51) Int. Cl.
*G01T 1/203* (2006.01)
*B32B 27/18* (2006.01)
(Continued)

(52) U.S. Cl.
CPC ........ *G01T 1/2033* (2013.01); *B29C 47/0004* (2013.01); *B32B 27/18* (2013.01);
(Continued)

(58) Field of Classification Search
CPC .................................................. G01T 1/2033
See application file for complete search history.

(56) References Cited

U.S. PATENT DOCUMENTS 3,418,470 A * 12/1968 Birkeland ................ G03C 1/73
250/474.1
4,637,898 A 1/1987 DeBoer et al.
(Continued)

FOREIGN PATENT DOCUMENTS

| EP | 0 124 683 A | 11/1984 | |
| GB | 2 096 160 A | 10/1982 | |
| WO | WO 2009008911 A2 * | 1/2009 | ............... G01T 1/16 |

OTHER PUBLICATIONS

Leblans et al., Storage Phosphors for Medical Imaging, Jun. 9, 2011, Materials, vol. 4, Issue 6, pp. 1034-1085.*
(Continued)

*Primary Examiner* — David Porta
*Assistant Examiner* — Jeremy S Valentiner (57) ABSTRACT

A storage phosphor panel can include an extruded inorganic storage phosphor layer including a thermoplastic polyolefin and an inorganic storage phosphor material, where the extruded inorganic storage phosphor panel has a DQE comparable to that of a traditional extruded inorganic solvent coated inorganic storage phosphor screen. Also disclosed is an inorganic storage phosphor detection system including an extruded inorganic storage phosphor panel that can include an extruded inorganic storage phosphor layer including a thermoplastic olefin and an inorganic storage phosphor material; and photodetector(s) coupled to the extruded inorganic storage phosphor panel to detect photons generated from the extruded inorganic storage phosphor panel. Further disclosed is a method of making an extruded inorganic storage phosphor panel that can include providing thermoplastic particles including at least one thermoplastic polyolefin and an inorganic storage phosphor material; and melt extruding the thermoplastic particles to form an extruded inorganic storage phosphor layer.

16 Claims, 5 Drawing Sheets

(51) Int. Cl.
*B29C 47/00* (2006.01)
*G21K 4/00* (2006.01)

(52) U.S. Cl.
CPC ............. *G21K 4/00* (2013.01); *Y10T 428/269* (2015.01); *Y10T 428/31913* (2015.04)

(56) References Cited

U.S. PATENT DOCUMENTS

| | | | | |
|---|---|---|---|---|
| 5,138,167 | A * | 8/1992 | Barnes | G01T 1/202 250/363.02 |
| 5,464,568 | A * | 11/1995 | Bringley | C09K 11/025 250/484.4 |
| 5,641,968 | A | 6/1997 | Suzuki et al. | |
| 6,624,436 | B1 * | 9/2003 | Kohda | C09K 11/7733 250/484.4 |
| 7,652,261 | B1 | 1/2010 | Wilson et al. | |
| 2002/0087073 | A1 * | 7/2002 | Hoffman | G01T 1/2002 600/425 |
| 2003/0003312 | A1 * | 1/2003 | Aylward | C09K 11/7701 428/480 |
| 2003/0104245 | A1 * | 6/2003 | Bergh | G21K 4/00 428/690 |
| 2004/0104500 | A1 | 6/2004 | Bross et al. | |
| 2005/0040340 | A1 * | 2/2005 | Morikawa | C09K 11/628 250/484.4 |
| 2005/0100836 | A1 * | 5/2005 | Laney | G03C 1/49881 430/496 |
| 2005/0100840 | A1 * | 5/2005 | Dickerson | G03C 1/83 430/496 |
| 2010/0272234 | A1 * | 10/2010 | Morse | G01T 1/201 378/62 |
| 2012/0153163 | A1 * | 6/2012 | Levene | G01T 1/2018 250/361 R |
| 2013/0001423 | A1 * | 1/2013 | Jagannathan | G21K 4/00 250/361 R |

OTHER PUBLICATIONS

Ehsan Samei et al., "A method for measuring the presampled MTF of digital radiographic systems using an edge test device", Med. Phys. vol. 25 (1), Jan. 1998, 1998 Am. Assoc. Phys. Med., pp. 102-113.

Ehsan Samei et al., "Intercomparison of methods for image quality characterization" I. Modulation transfer function, Med. Phys. vol. 33 (5), May 2006, 1998 Am. Assoc. Phys. Med., pp. 1454-1465.

Ehsan Samei et al., "Comparison of edge analysis techniques for the determination of the MTF of digital radiographic systems", Phys. Med. Biol. vol. 50, 2005, pp. 3613-3625, Physics in Medicine and Biology.

Hiroshi Fujita et al., "A simple method for determining in modulation transfer function in digital Radiography", IEEE Transactions on Medical Imaging, vol. 11, No. 1, Mar. 1992, pp. 34-39.

I. A. Cunningham et al., "A method for modulation transfer function determination from edge profiles with correction for finite-element differentiation", Med. Phys. vol. 14, (4), Jul./Aug. 1987, 1987 Am. Assoc. Phys. Med, pp. 533-537.

International Search Report dated Nov. 27, 2012 for International Application No. PCT/US2012/043062, 2 pages.

M. B. Williams et al., "Analysis of the Detective Quantum Efficiency of a Development Detector for Digital Mammography", Medical Physics, Nov. 1999, vol. 26 (11), Am. Assoc. Phys. Med., pp. 2273-2285.

European Office Action from EP Application Serial No. 12 740 748.4-1355 dated Apr. 14, 2015; 5 pages.

* cited by examiner

SINGLE LAYER EXTRUDED STORAGE PHOSPHOR PANEL

FIG. 4A

TWO LAYER EXTRUDED STORAGE PHOSPHOR PANEL
WITH A LIGHT ABSORBING SECOND LAYER

RADIATION SENSING THERMOPLASTIC COMPOSITE PANELS

FIELD OF THE INVENTION

The invention relates generally to the field of inorganic storage phosphor materials, and in particular to extruded inorganic storage phosphor materials including thermoplastic polyolefins and inorganic storage phosphor materials. More specifically, the invention relates to an extruded inorganic storage phosphor panel including an extruded inorganic storage phosphor layer comprising thermoplastic polyolefins and inorganic storage phosphor materials, and method for making the same.

BACKGROUND OF THE INVENTION

Scintillators are materials that convert high-energy radiation, such as X-rays and gamma rays, into visible light. Scintillators are widely used in detection and non-invasive imaging technologies, such as imaging systems for medical and screening applications. In such systems, high-energy photons (e.g., X-rays from a radiation source) typically pass through the person or object undergoing imaging and, on the other side of the imaging volume, impact a scintillator associated with a light detection apparatus. The scintillator typically generates optical photons in response to high-energy photon collisions. The optical photons may then be measured and quantified by light detection apparatuses, thereby providing a surrogate measure of the amount and location of high-energy radiation incident on the light detector (usually a photodetector).

For example, a scintillator panel is typically used in computed tomography (CT) imaging systems. In CT systems, an X-ray source emits a fan-shaped beam towards a subject or object capable of being imaged, such as a patient or a piece of luggage. The high-energy photons from X-rays, after being attenuated by the subject or object, collide with a scintillator panel. The scintillator panel converts the X-rays to light energy ("optical photons") and the scintillator panel illuminates, discharging optical photons that are captured by a photodetector (usually a photodiode) which generates a corresponding electrical signal in response to the discharged optical photons. The photodiode outputs are then transmitted to a data processing system for image reconstruction. The images reconstructed based upon the photodiode output signals provide a projection of the subject or object similar to those available through conventional photographic film techniques.

Resolution is a critical criterion for any imaging system or device, especially in CT systems and the like. In the case of CT and other like imaging systems, a number of factors can determine resolution; however, this application focuses on the scintillation panel and its effects on resolution. When a continuous, homogeneous scintillation layer is used, lateral propagation of scintillation light is known to reduce image resolution. For example, when optical photons are generated in response to X-ray exposure, these optical photons can spread out or be scattered in the scintillation panel, due to optical properties of the panel, and can be detected by more than one photodetector coupled to the scintillation panel. Detection by more than one photodetector usually results in reduced image resolution. Several approaches have been developed to help offset optical photon diffusion, including reducing the thickness of the scintillation layer. This reduces the distance the optical photons may travel in the scintillation layer. However, the thinner the scintillation layer, the lower the conversion efficiency since there is less scintillating material for a source radiation photon to stimulate. Thus, the optimum scintillation layer thickness for a given application is a reflection of the balance between imaging speed and desired image sharpness.

Another approach known in the art is to employ thallium doped cesium iodide (CsI:Tl) scintillation layers. Thallium doped cesium iodide scintillation panels have the potential to provide excellent spatial resolution for radiographic applications since CsI-based panels are able to display high X-ray absorptivity and high conversion efficiency. However, this potential is difficult to realize in practical applications due to the mechanical and environmental fragility of CsI-based materials. For example, CsI is highly water soluble and hygroscopic. Any scintillation panels made with CsI:Tl must be maintained in a sealed, low humidity environment to avoid attracting water that can negatively affect luminescence. CsI:Tl structures are also mechanically fragile, requiring special handling procedures during and after manufacture such as complete enclosure in shock resistant containers. As a result, production (and end product) costs are quite high in applications that have successfully realized the image quality benefit of thallium doped cesium iodide scintillation panels.

An alternative approach to using thallium doped cesium iodide is to increase the transparency of the scintillation layer in the scintillator panel. It is generally understood that a perfectly transparent scintillator panel would provide the highest spatial resolution. However, while the most transparent scintillator would be a single crystal, single crystal scintillator panels have not yet been constructed with practically useful dimensions and sufficient X-ray absorptivity for radiographic applications. Another option for increasing transparency is to disperse particulate scintillators in a polymeric matrix having a refractive index identical or closely similar to that of the scintillator; however, this approach requires a high loading of scintillator particles in the polymeric matrix, which to date has not yet been successfully achieved with practically useful dimensions and sufficiently high scintillator particulate loads.

While prior techniques may have achieved certain degrees of success in their particular applications, there is a need to provide, in a cost-friendly manner, transparent scintillator panels having not only image quality approaching that of CsI-based scintillator panels but also excellent mechanical and environmental robustness.

SUMMARY OF THE INVENTION

An aspect of this application is to advance the art of medical imaging systems.

Another aspect of this application to address in whole or in part, at least the foregoing and other deficiencies in the related art.

It is another aspect of this application to provide in whole or in part, at least the advantages described herein.

In an aspect, there is provided an extruded inorganic storage phosphor panel including an extruded inorganic storage phosphor layer comprising a thermoplastic polyolefin and an inorganic storage phosphor material, wherein the extruded it organic storage phosphor panel has a DQE that is comparable to the DQE of the traditional solvent coated screen of equivalent x-ray absorbance.

In another aspect, there is also disclosed an inorganic storage phosphor detection system including an extruded inorganic storage phosphor panel comprising an extruded inorganic storage phosphor layer comprising a thermoplastic olefin and an inorganic storage phosphor material; and at least one photodetector coupled to the extruded inorganic storage phosphor panel, wherein at least one photodetection is configured to detect photons generated from the extruded inorganic storage phosphor panel.

In a further aspect, there is disclosed a method of making an extruded inorganic storage phosphor panel including providing thermoplastic polymer comprising at least one thermoplastic polyolefin and an inorganic storage phosphor material; and melt extruding the thermoplastic polymer and the inorganic storage phosphor material to form an extruded inorganic storage phosphor layer.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

The following is a detailed description of the preferred embodiments of the invention, reference being made to the drawings in which the same reference numerals identify the same elements of structure in each of the several figures.

Exemplary embodiments herein provide transparent scintillator panels including an extruded scintillation layer with a thermoplastic polyolefin and a scintillator material, and methods of preparing thereof. In embodiments, the transparent scintillator panel has an intrinsic MTF at least 5% greater than the iH50 of a solvent-coated DRZ-screen.

It should be noted that while the present description and examples are primarily directed to radiographic medical imaging of a human or other subject, embodiments of apparatus and methods of the present application can also be applied to other radiographic imaging applications. This includes applications such as non-destructive testing (NDT), for which radiographic images may be obtained and provided with different processing treatments in order to accentuate different features of the imaged subject.

Figure 1A:
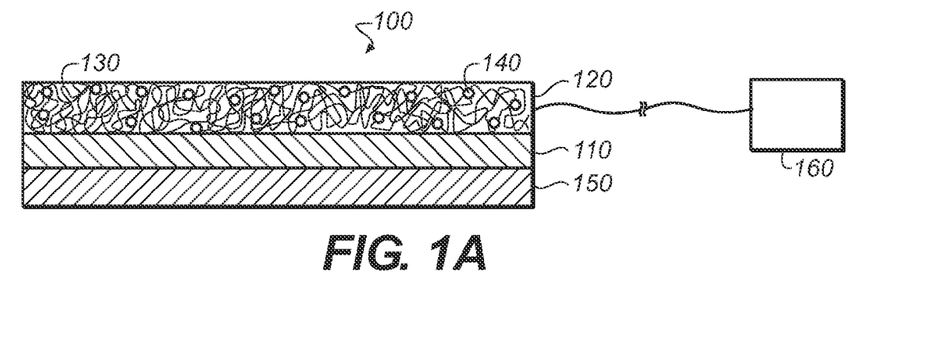
FIGS. 1A-1C depict exemplary portions of scintillator panels in accordance with various embodiments of the present disclosure.
Figure 1B:
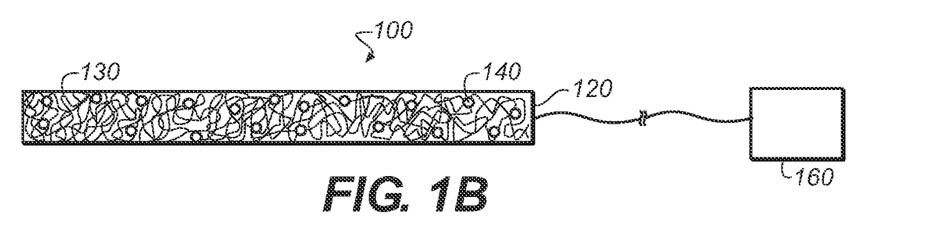
Figure 1C:
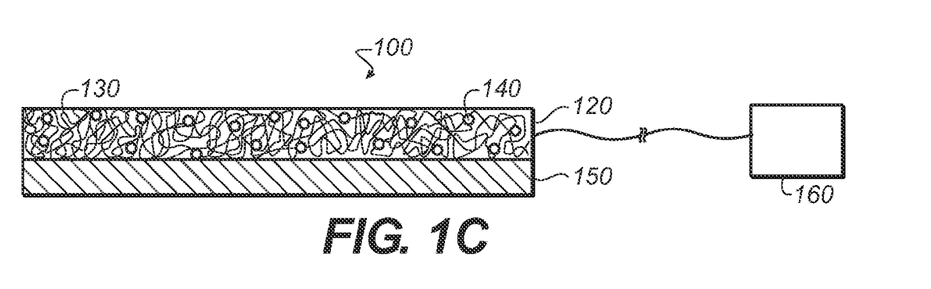

FIG. 1 depicts a portion of an exemplary transparent scintillator panel 100 in accordance with various embodiments of the present disclosure. As used herein, "scintillator panel" is understood to have its ordinary meaning in the art unless otherwise specified, and refers to panels or screens that can generate visible light immediately upon exposure to X-radiation (also known as "prompt emission panels" or "intensifying screens"). As such, "panels" and "screens" are used interchangeably herein. It should be readily apparent to one of ordinary skill in the art that the scintillator panel 100 depicted in FIG. 1 represents a generalized schematic illustration and that other components can be added or existing components can be removed or modified.

Scintillator panels disclosed herein can take any convenient form provided they meet all of the usual requirements for use in computed or digital radiography. As shown is FIG. 1A, the scintillator panel 100 may include a support 110 and an extruded scintillation layer 120 disposed over the support 110. Any flexible or rigid material suitable for use in scintillator panels can be used as the support 110, such as glass, plastic films, ceramics, polymeric materials, carbon substrates, and the like. In certain embodiments, the support 110 can be made of ceramic, (e.g., $Al_2O_3$), or metallic (e.g., Al) or polymeric (e.g., PET) materials. Also as shown in FIG. 1A, in an aspect, the support 110 can be coextruded with the scintillation layer 120. Alternatively, if desired, a support can be omitted in the scintillator panel. As shown in FIGS. 1B and 1C, the scintillator panel can include a scintillation layer 120 and/or an opaque layer 150 without a support.

In an aspect, an opaque layer 150 can be extruded, for example melt extruded, on the sup port 110 to eliminate ambient light from reaching the scintillation layer. For example, in an embodiment, the opaque layer 150 can comprise black dyes or carbon black and a suitable binder, such as polyethylene (e.g., LDPE). As shown in FIG. 1A, the opaque layer 150 can be extruded on the backside of the support 110 (e.g., on the opposite side of the support 110 having the scintillation layer 120), or on the same side as the scintillation layer (e.g., sandwiched in between the support 110 and the scintillation layer 120). Alternatively, if the support 110 comprises a carbon support having a black surface (e.g., graphite) an opaque layer may not be needed. In yet another aspect, the opaque layer 150 can be co-extruded with the scintillation layer, without or without a support, as seen in FIG. 1C.

In an aspect, an anticurl layer may be coextruded on either side of the support, if a support is used, or on side of the scintillator screen, to manage the dimensional stability of the scintillator screen.

The thickness of the support 110 can vary depending on the materials used so long as it is capable of supporting itself and layers disposed thereupon. Generally, the support can have a thickness ranging from about 50 μm to about 1,000 μm, for example from about 80 μm to about 1000 μm, such as from about 80 μm to about 500 μm. The support 110 can have a smooth or rough surface, depending on the desired application. In an embodiment, the scintillator panel does not comprise a support.

The scintillation layer 120 can be disposed over the support 110, if a support is included. Alternatively, the scintillation layer 120 can be extruded alone or co-extruded with an opaque layer, and anticurl layer, and combinations thereof, as shown in FIGS. 1B and 1C.

The scintillation layer 120 can include a thermoplastic polyolefin 130 and a scintillator material 140. The thermoplastic polyolefin 130 may be polyethylene, a polypropylene, and combinations thereof. In an aspect, the polyethylene can be high density poly low density polyethylene (LDPE), medium density polyethylene (MDPE), linear low density polyethylene (LLDPE), very low density polyethylene (VLDPE), and the like. In a preferred embodiment, the thermoplastic polyolefin 130 is low density polyethylene (LDPE). The thermoplastic polyolefin 130 can be present in the scintillation layer 120 in an amount ranging from about 1% to about 50% by volume, for example from about 10% to about 30% by volume, relative to the total volume of the scintillation layer 120.

The scintillation layer 120 can include a scintillator material 140. As used herein, "scintillator material" and "scintillation material" are used interchangeably and are understood to have the ordinary meaning as understood by those skilled in the art unless otherwise specified. "Scintillator material" refers to inorganic materials capable of immediately emitting low-energy photons (e.g., optical photons) upon stimulation with and absorption of high-energy photons (e.g., X-rays). Materials that can be used in embodiments of the present disclosure include metal oxides, metal oxyhalides, metal oxysulfides, metal halides, and the like, and combinations thereof. In embodiments, the scintillator material 140 can be a metal oxide, for example, $Y_2SiO_5$:Ce; $Y_2Si_2O_7$:Ce; $LuAlO_3$:Ce; $Lu_2SiO_5$:Ce; $Gd_2SiO_5$:Ce; $YAlO_3$:Ce; ZnO:Ga; $CdWO_4$; $LuPO_4$:Ce; $PbWO_4$; $Bi_4Ge_3O_{12}$; $CaWO_4$; $RE_3Al5O_{12}$:Ce, and combinations thereof, wherein RE is at least one rare earth metal. In another embodiment, the scintillator material 140 can include one or more metal oxysulfides in addition to, or in place of, the metal oxides, such as $Gd_2O_2S$, $Gd_2O_2S$:Tb, $Gd_2O_2S$:Pr, and the like, and combinations thereof. In other embodiments, the scintillator material 140 can include a metal oxyhalide, such as LaOX:Tb, wherein X is Cl, Br, or I. In further embodiments, the scintillator material 140 can be a metal halide having a general formula of $M(X)_n$:Y, wherein M is at least one of La, Na, K, Rb, Cs; each X is independently F, Cl, Br, or I; Y is at least one of Tl, Tb, Na, Ce, Pr, and Eu; and n is an integer between 1 and 4, inclusive. Such metal halides can include, for example, $LaCl_3$:Ce and $LaBr_3$:Ce, among others. Other metal halide species that can be used in embodiments of the present disclosure include $RbGd_2F_7$:Ce, $CeF_3$, $BaF_2$, CsI(Na), $CaF_2$:Eu, LiI:Eu, CsI, CsF, CsI:Tl, NaI:Tl, and combinations thereof. Halide-like species, such as CdS:In, and ZnS can also be used in embodiments of the present disclosure. Preferably, the scintillator material 140 is a metal oxysulfide, such as $Gd_2O_2S$.

In embodiments, the scintillator material 140 can be present in the extruded scintillation layer 120 in an amount ranging from about 50% by volume to about 99% by volume, for example from about 70% by volume to about 90% by volume, relative to the volume of the extruded scintillator layer 120.

The thermoplastic polyolefin 130 and the scintillator material 140 are melt compounded to form composite thermoplastic particles which are then extruded to form the scintillation layer 120. For example: the composite thermoplastic particles can be prepared by melt compounding the thermoplastic polyolefin 130 with the scintillator material 140 using a twin screw compounder. The ratio of thermoplastic polyolefin 130 to scintillator material 140 (polyolefin:scintillator) can range from about 1:100 to about 1:0.01, by weight or volume, preferably from about 1:1 to about 1:0.1, by weight or volume. During melt compounding, the thermoplastic olefin 130 and the scintillator material 140 can be compounded and heated through ten heating zones. For example, the first heating zone can have a temperature ranging from about 175° C. to about 180° C.; the second heating zone can have a temperature ranging from about 185° C. to about 190° C.; the third heating zone can have a temperature ranging from about 195° C. to about 200° C.; the fourth heating zone can have a temperature ranging from about 195° C. to about 200° C.; the fifth heating zone can have a temperature ranging from about 185° C. to about 190° C.; the sixth heating zone can have a temperature ranging from about 185° C. to about 190° C.; the seventh heating zone can have a temperature ranging from about 185° C. to about 190° C.; the eighth heating zone can have a temperature ranging from about 185° C. to about 190° C.; the ninth heating zone can have a temperature ranging from about 180° C. to about 175° C.; and the tenth heating zone can have a temperature ranging from about 175° C. to about 170° C. The period of time in each zone depends on the polymer used. Generally, the polymer can be heated for a time and temperature sufficient to melt the polymer and incorporate the scintillator material without decomposing the polymer. The period of time in each zone can range from about 0.1 minutes to about 30 minutes, for example from about 1 minute to about 10 minutes. Upon exiting the melt compounder, the composite thermoplastic material can enter a water bath to cool and harden into continuous strands. The strands can be pelletized and dried at about 40° C. The screw speed and feed rates for each of the thermoplastic polyolefin 130 and the scintillator material 140 can be adjusted as desired to control the amount of each in the composite thermoplastic material.

The composite thermoplastic material can be extruded to form the scintillation layer 120 in which the scintillator material 140 is intercalated ("loaded") within the thermoplastic polyolefin 130. For example, the scintillation layer 120 can be formed by melt extruding the composite thermoplastic material. Without being limited by theory, it is believed that forming the scintillation layer 120 by extrusion increases the homogeneity of the scintillation layer, increases optical transparency, and eliminates undesirable "evaporated space" (which can contribute to decreased spatial resolution) when a solvent is evaporated in solvent-coating methods (e.g., DRZ-Plus ("DRZ+") screens, available from MCI Optonix, LLC), thereby increasing the optical transparency of the scintillation layer 120 and spatial resolution of a scintillator panel comprising the disclosed scintillation layer 120. A transparent scintillator panel 100 according to the present disclosure can thus have excellent high-energy radiation absorption ("stopping power") and high conversion efficiency, as well as mechanical and environmental robustness.

In embodiments, a transparent scintillator panel 100 having the disclosed extruded scintillation layer 120 can have an intrinsic MTF at least 5% greater than the iH50 of a solvent-coated DRZ+ screen, for example about 50% to about 95% greater than the iH50 of a solvent-coated DRZ+ screen. As used herein, intrinsic MTF (also known as "universal MTF") is understood to have its ordinary meaning in the art unless otherwise specified, and can be derived from the modulation transfer function (MTF). Intrinsic MTF (iMTF) can be derived from MTF, as shown in the following formula: $iMTF(v)=MTF(f*l)$, where f is the spatial frequency and L is the screen thickness. ($v=f*l$ is therefore a dimensionless quantity). As used herein, iH50 is the value of v at which the iMTF=0.5. As used herein, the measure of improvement in iH50 is calculated with respect to the iH50 of a DRZ+ screen.

In computed or digital radiography, the MTF is dominantly decided by the scintillator panels used for X-ray absorption. Many well-established methods can be used for measuring MTF, all of which basically involve capturing the gray scale gradation transition in the X-ray image of an object that provides an abrupt change in X-ray signal from high to low. Exemplary methods of measuring MTF are described in A. Cunningham and A. Fenster, "A method for modulation transfer function determination from edge profiles with correction for finite element differentiation," Med. Phys. 14, 533-537 (1987); H. Fujita, D. Y. Tsai, T. Itoh, K. Doi, J. Morishita, K. Ueda, and A. Ohtsuka, "A simple method for determining the modulation transfer function in digital radiography," IEEE Trans. Med. Imaging 11, 34-39 (1992); E. Samei and M. J. Flynn, "A method for measuring the presampling MTF of digital radiographic systems using an edge test device," Med. Phys. 25, 102-113 (1998); E. Samei, E. Buhr, P Granfors, D Vandenbroucke and X Wang, "Comparison of edge analysis techniques for the determination of the MTF of digital radiographic systems," Physics in Medicine and Biology 50 (15) 3613 (2005); E Samei, N. T. Ranger, J. T. Dobbins, and Y. Chen, "Intercomparison of methods for image quality characterization. I. Modulation transfer function," Med. Phys. 33, 1454 (2006), the disclosures all of which are herein incorporated by reference in their entirety.

In a preferred embodiment, the scintillation layer 120 is co-extruded with an opaque layer 150, without a substrate. The screw speed and pump speed of the melt extruder can be adjusted to control the thickness for each of the scintillation layer 120 and the opaque layer, individually. In aspects, the extruded scintillation layer 120 does not comprise ceramic fibers.

The thickness of the scintillation layer 120 can range from about 10 μm to about 1000 μm, preferably from about 50 μm to about 750 μm, more preferably from about 100 μm to about 500 μm.

Optionally, the transparent scintillator panel 100 can include a protective overcoat disposed over the scintillation layer 120. The protective overcoat can comprise one or more polymer binders normally used for this purpose, such as cellulose ester (e.g., cellulose acetate) and other polymers that provide the desired mechanical strength and scratch and moisture resistance. However, inclusion of a protective layer on the transparent scintillator panel 100 can reduce spatial resolution.

In an embodiment, a scintillation detection system can include the disclosed transparent scintillator panel 100 coupled to at least one photodetector 160. The at least one photodetector 160 can be configured to detect photons generated from the transparent scintillator panel 100. Non-limiting examples of at least one photodetector 160 include photodiodes, photomultiplier tubes (PMT), CCD sensors (e.g., EMCCD), image intensifiers, and the like, and combinations thereof. Choice of a particular photodetector will depend, in part, on the type of scintillation panel being fabricated and the intended use of the ultimate device fabricated with the disclosed scintillation panel.

EXAMPLES

Composite Thermoplastic Particle Production

Composite thermoplastic particles according to the present disclosure were prepared comprising 80 wt. % gadolinium oxysulfide ($Gd_2O_2S$) ("GOS") and 20 wt. % low density polyethylene (LDPE 811A, available from Westlake Chemical Corp. of Houston, Tex.). The GOS powder was loaded into Feeder 2 and the LDPE was loaded into Feeder 4 of a Leistritz twin screw compounder. The die temperature was set to 200° C. and 10 heating zones within the compounder were set to the temperatures shown in Table 1 below:

TABLE 1

| Zone | 1 | 2 | 3 | 4 | 5 | 6 | 7 | 8 | 9 | 10 |
|---|---|---|---|---|---|---|---|---|---|---|
| Temp (° C.) | 180 | 190 | 200 | 200 | 190 | 190 | 190 | 190 | 175 | 170 |

The screw speed was 300 RPM, and the GOS powder and LDPE were gravity fed into the screw compounder. After exiting the die, the composite thermoplastic particles, comprising LDPE loaded with $Gd_2O_2S$, entered a 25° C. water bath to cool and hardened into continuous strands. The strands were then pelletized in a pelletizer and dried at 40° C.

Co-Extrusion of Scintillator Layer and Opaque Layer

5% carbon black particles in LDPE were prepared by melt compounding carbon black masterbatch (Ampacet black MB—191029, available from Amapacet Corp. of Tarrytown, N.Y.) with LDPE (811A, available from Westlake Chemical Corp. of Houston, Tex.) in a Leistritz twin screw compounder under the same conditions used to produce the composite thermoplastic material. The carbon black masterbatch was loaded into Feeder 1 and the LDPE was loaded into Feeder 4 of the twin screw compounder. The screw speed was 300 RPM, and the carbon black and LDEP were gravity fed into the screw compounder. After exiting the die, the carbon black entered a 25° C. water bath to cool and hardened into continuous strands. The strands were then pelletized in a pelletizer and dried at 40° C.

For each of Inventive Examples 1 through 3, the pelletized composite thermoplastic materials were loaded into a single screw Killion extruder and the pelletized carbon black particles was loaded into a single screw Davis-Standard extruder. Within each extruder, heating zones were set to the temperatures shown in Tables 2A and 2B below:

TABLE 2A

| Davis-Standard Extruder | |
|---|---|
| Zone | Temp |
| 1 | 350° F. |
| 2 | 380° F. |
| 3 | 400° F. |
| Exit flange | 400° F. |
| Poly line 1 | 400° F. |
| Poly line 2 | 400° F. |
| Melt pump | 400° F. |

TABLE 2B

Killion Extruder

| Zone | Temp |
|---|---|
| 1 | 350° F. |
| 2 | 380° F. |
| 3 | 400° F. |
| 4 | 400° F. |
| Gate | 400° F. |
| Adapter | 400° F. |
| Poly line | 400° F. |
| Melt pump | 400° F. |

Both types of pelletized materials (composite thermoplastic and carbon black) were co-extruded through a single die with the die temperature set at 400° F. form a transparent scintillator panel (Inventive Panels 1 and 2). The pelletized composite thermoplastic material formed a transparent scintillation layer, and the pelletized carbon black formed a carbon black layer underneath the transparent scintillation layer. For each of Inventive Panels 1 and 2, the screw speed, feed rates, and layer thicknesses are described in Table 3 below. For Inventive Panel 3, the carbon black layer was not co-extruded with the composite thermoplastic materials; instead, a black film of optical density (OD) 4.5 was placed underneath the scintillation layer during radiographic measurements.

TABLE 3

| | Screw Speed (RPM) | Feed Rate | Scintillation layer thickness (micron) | Carbon Black layer thickness (micron) |
|---|---|---|---|---|
| Inventive Panel 1 | 300 | gravity | 450 | 200 |
| Inventive Panel 2 | 300 | gravity | 240 | 200 |
| Inventive Panel 3 | 300 | gravity | 256 | N/A |

The characteristics of Inventive Panels 1 through 3 described above and three types of scintillation panels known in the art are described in Table 4 below:

TABLE 4

| Panel Type | Crystal | Method | Scintillation layer thickness (microns) | X-ray Absorption | Packing Density |
|---|---|---|---|---|---|
| DRZ+ | Powder | Solvent-coated | 208 | 0.54 | 0.64 |
| MIN-R EV | Powder | Solvent-coated | 90 | 0.24 | 0.5 |
| CsI | Needle | Vapor deposition | 600 | 0.88 | 0.75 |
| Inventive Panel 1 | Powder | Extrusion | 450 | 0.57 | 0.32 |
| Inventive Panel 2 | Powder | Extrusion | 240 | 0.36 | 0.31 |
| Inventive Panel 3 | Powder | Extrusion | 256 | 0.49 | 0.44 |

Figure 2:
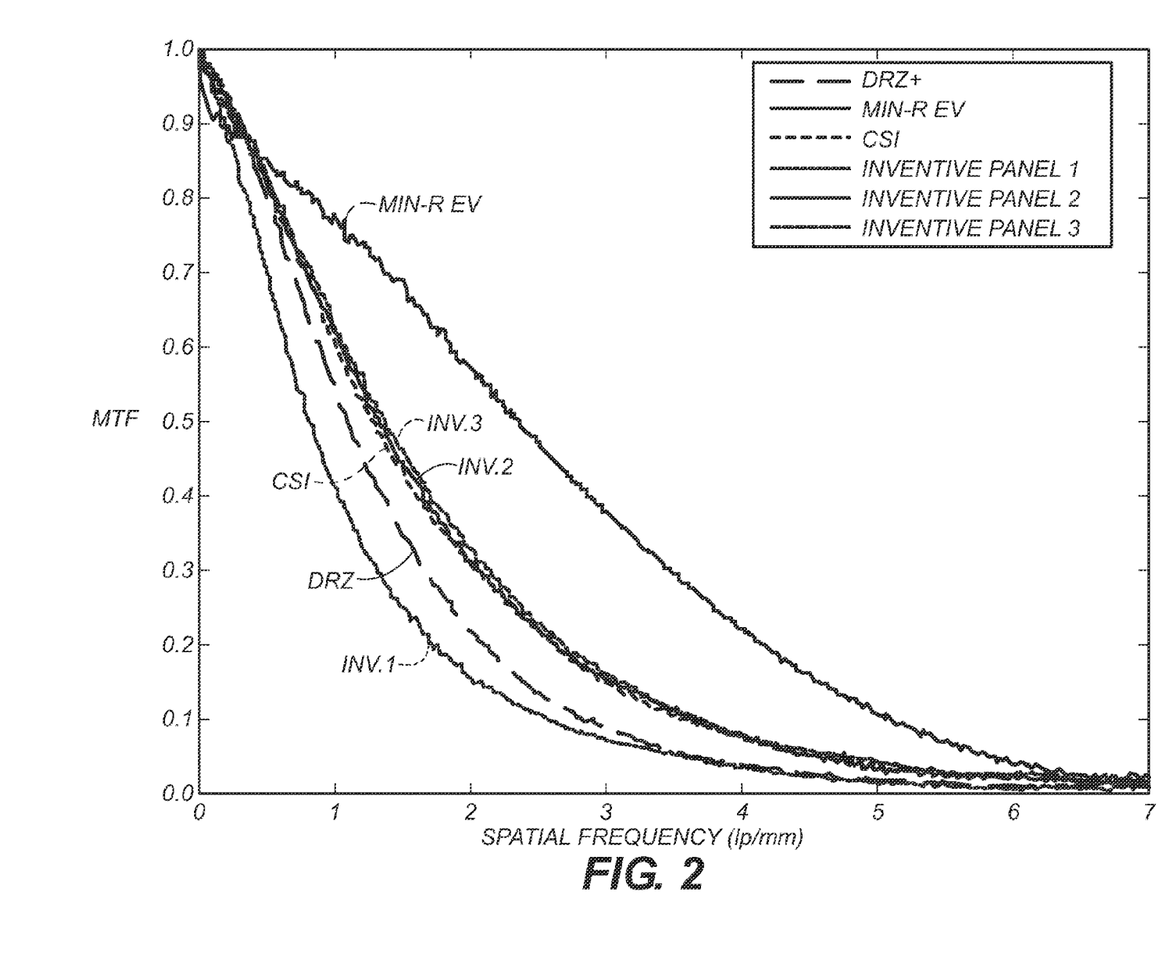
FIG. 2 compares the MTF performance of a scintillator panel in accordance with various embodiments of the present disclosure versus comparative scintillator panels in the art.
Figure 3:
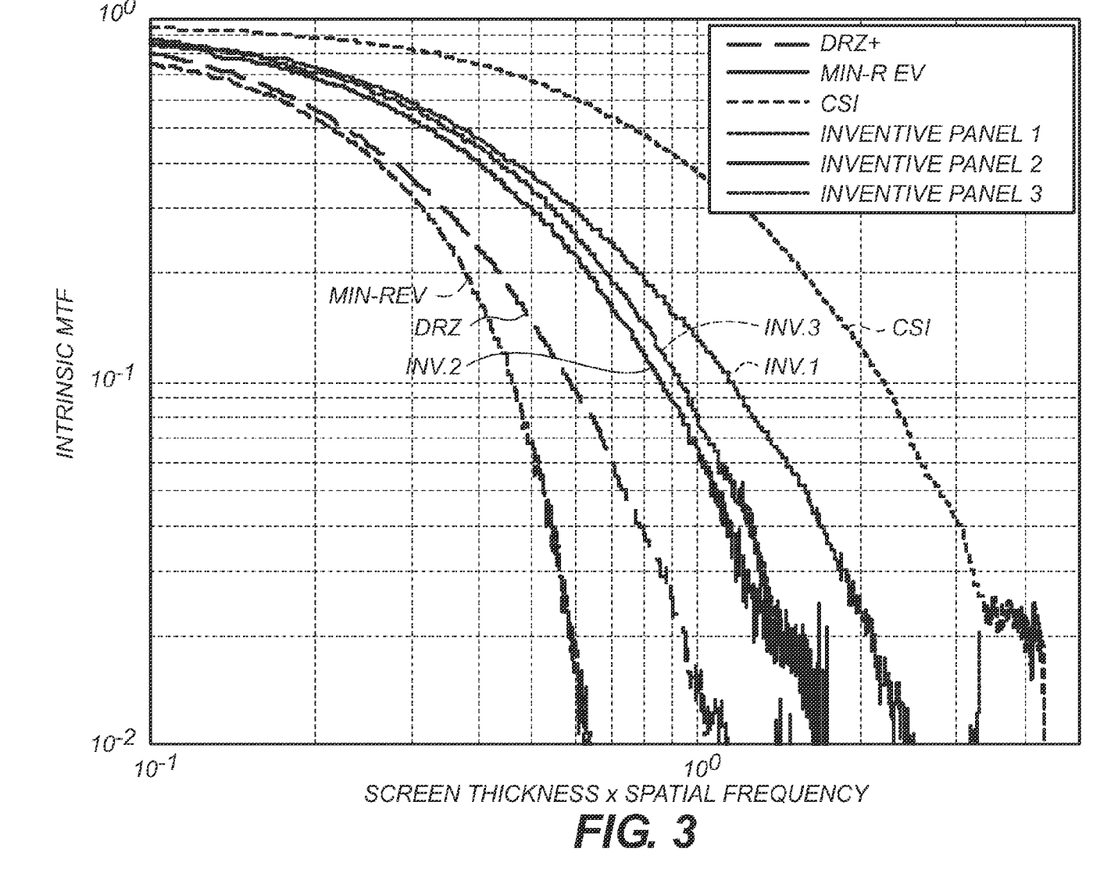
FIG. 3 compares the intrinsic MTF performance of a scintillator panel in accordance with various embodiments of the present disclosure versus scintillator panels in the art.

The MTFs of all of the panels in Table 4 were measured using MTF methods described above. Results are shown in FIG. 2. The intrinsic MTFs of all the panels in Table 4 were calculated from the measured MTF using the equation $iMTF(v)=MTF(f*l)$, as shown in FIG. 3. The iH50 (value of v at which iMTF=0.5) was also calculated for each of the panels in Table 4, using the same equation above, as described in Table 5 below:

TABLE 5

| Panel Type | iH50 |
|---|---|
| DRZ+ | 0.22 |
| MinR-EV | 0.21 |
| CsI | 0.76 |
| Inventive Panel 1 | 0.37 |
| Inventive Panel 2 | 0.24 |
| Inventive Panel 3 | 0.345 |

As seen in FIGS. 2 and 3, a large gap exists between the MTF and iMTF performance of solvent-coated panels (DRZ+, available from MCI Optonix, LLC, and Kodak MIN-R EV, available from Carestream Health) versus CsI panels; however, the MTFs and iMTFs of the disclosed extruded panels are superior to the solvent-coated panels and approach the iMTF of CsI panels. Without being limited by theory, it is believed that forming the scintillation layer 120 by extrusion increases the homogeneity of the scintillation layer and eliminates undesirable "evaporated space" (which can contribute to decreased spatial resolution) when a solvent is evaporated in solvent-coating methods, thereby increasing the transparency of the scintillation layer 120 and spatial resolution of a scintillator panel comprising the disclosed scintillation layer 120. Additionally, without being limited by theory, it is also believed that the disclosed extruded scintillator panels have reduced refractive index mismatching as compared to solvent-coated panels (i.e., when the materials comprising the scintillation layer have disparate refractive indices, the amount of optical photons scattered is relatively large; the more disparate the refractive indices, the more light is scattered, the lower the image resolution), and therefore display increased transparency and improved spatial resolution as compared to solvent-coated panels.

Near the beginning of the $20^{th}$ century, it was recognized that a medically useful anatomical image could be obtained when a film containing a radiation-sensitive silver halide emulsion is exposed to X-radiation (X-rays) passing through the patient. Subsequently, it was recognized that X-ray exposure could be decreased considerably by placing a radiographic phosphor panel adjacent to the film.

A radiographic phosphor panel typically contains a layer of an inorganic phosphor that can absorb X-rays and emit light to expose the film. The inorganic phosphor layer is generally a crystalline material that responds to X-rays in an image-wise fashion. Radiographic phosphor panels can be classified, based on the type of phosphors used, as prompt emission panels and image storage panels.

Image storage panels (also commonly referred to as "inorganic storage phosphor panels") typically contain a storage ("stimulable") phosphor capable of absorbing X-rays and storing its energy until subsequently stimulated to emit light in an image-wise fashion as a function of the stored X-ray pattern. A well-known use for inorganic storage phosphor panels is in computed or digital radiography. In these applications, the panel is first image-wise exposed to X-rays, which are absorbed by the inorganic phosphor particles, to create a latent image. While the phosphor particles may fluoresce to some degree, most of the absorbed X-rays are stored therein. At some interval after initial X-ray exposure, the inorganic storage phosphor panel is subjected to longer wave length radiation, such as visible or infrared light (e.g., stimulating light), resulting in the emission of the energy stored in the phosphor particles as stimulated luminescence (e.g, stimulated light) that is detected and converted into sequential electrical signals which are processed in order to render a visible image on recording materials, such as light-sensitive films or digital display devices (e.g., television or computer monitors). For example, an inorganic storage phosphor panel can be image-wise exposed to X-rays and subsequently stimulated by a laser having a red light or infrared beam, resulting in green or blue light emission that is detected and converted to electrical signals which are processed to render a visible image on a computer monitor. Thereafter, images from inorganic storage phosphor panels can be "erased" by exposure to UV radiation, such as from fluorescent lamps.

Thus, inorganic storage phosphor panels are typically expected to store as much incident X-rays as possible while emitting stored energy in a negligible amount until after subsequent stimulation; only after being subjected to stimulating light should the stored energy be released. In this way, inorganic storage phosphor panels can be repeatedly used to store and transmit radiation images.

By the same token, because inorganic storage phosphor panels can be repeatedly used, it is important to protect the phosphor layer from mechanical and environmental damage. Degradation of final images in inorganic storage phosphor panels from environmental factors (e.g., humidity, oxygen exposure, liquid exposure, etc.) or for mechanical reasons (e.g., abrasion, jamming, wear and tear, etc.) have been concerns for many years. This is particularly important, for example, in radiographic phosphor panels that are transported in scanning modules and/or handled without protective encasings. A solution is to either minimize or eliminate the mechanical and environmental damage, or to significantly simplify the method of manufacture of the inorganic storage phosphor panel, so that it is less expensive, and frequent replacement of the panel due to degradation is an acceptable solution.

Lowering the cost of manufacture of the traditional, solvent coated inorganic storage phosphor panels has been a continuous source of investigation, but these evolutionary approaches have achieved limited success. Solutions that enable significant decrease in the cost structure of inorganic storage phosphor panels require alternate approaches, such as melt extrusion with a thermoplastic polymer, with judicious choice of materials and process conditions, to retain the imaging criteria of the highly sensitive (to the processing environment) inorganic storage phosphors. Detective quantum efficiency (DQE) is a useful criterion to compare the imaging performance of storage phosphor panels, and is a useful monitor to determine if the radical change in the manufacturing method provides an adequately equivalent panel.

Unlike prompt emitting scintillators (e.g., gadolinium oxysulfide or GOS), storage phosphors (e.g., europium doped barium fluorobromoiodide) are much more reactive/sensitive to manufacturing, and can lose their efficacy very easily if polymeric binder(s) or the additives used to with the polymeric binder(s) to promote the compatibility of the storage phosphor and the polymer(s), and/or the melt processing temperature and the time the storage phosphor spends in the reaction zone, with the polymeric binder(s) and the additives are not appropriate. Hence, in order to make melt extrusion a realistic option for making storage phosphor panels requires a careful choice of melt extrusion thermoplastic polymers, additives and thermal processing conditions.

Storage phosphors (e.g., europium doped barium fluorobromoiodide) are much more sensitive to oxidation than prompt emitting scintillators (e.g., GOS). For example, europium in "europium doped barium fluorobromoiodide" storage phosphor has to remain in the Eu(II) oxidation state for it to function as a storage phosphor, and higher temperature, and the presence of organic/polymeric species in the vicinity of the phosphor can induce the oxidation of Eu(II) to Eu(III), thus deactivation of the phosphor. Also, iodide ($I^-$) that is present in the "europium doped barium fluorobromoiodide" phosphor also has a tendency to be oxidized to iodine ($I_2$) in the presence of organic/polymeric species at high temperatures, and can result in the degradation of the performance of the phosphor (e.g., speed loss, discoloration, etc.). When storage phosphors react or oxidize, their efficacy degrades and such storage phosphors are no longer useable in storage phosphor panels. The oxidation of storage phosphors can be increased with increasing temperature and/or exposure to reactive groups. In a melt extrusion process, the extrusion materials are subjected to temperatures well above room temperature. Further, polymeric binders, an essential component of the extrusion materials, contain, in addition, trace amounts of catalysts used in the synthesis of the polymer, which generally promote the oxidation of any inclusions, such as the storage phosphor particles, in this case. Thus, storage phosphors would not be expected to retain their efficacy in a melt extrusion process. However, using melt extrusion to manufacture storage phosphor panels can provide reduced manufacturing cost.

Exemplary embodiments herein provide extruded inorganic storage phosphor panels including an extruded inorganic storage phosphor layer with a thermoplastic polyolefin and an inorganic storage phosphor material, and methods of preparing thereof. In embodiments, the extruded inorganic storage phosphor panel has a DQE that is comparable to that of the storage phosphor panel.

Figure 4A:
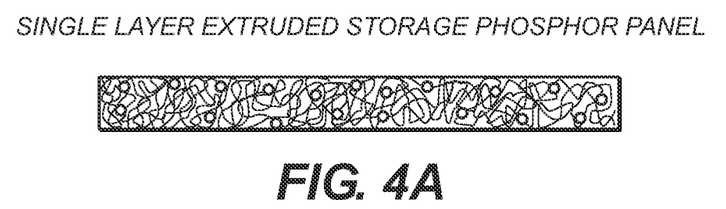
FIGS. 4a and 4b depict exemplary portions of inorganic storage phosphor panel in accordance with various embodiments of the present disclosure.

FIG. 4a depicts a portion of an exemplary extruded inorganic storage phosphor panel 100 in accordance with various embodiments of the present disclosure. As used herein, "inorganic storage phosphor panel" is understood to have its ordinary meaning in the art unless otherwise specified. As such, "panels" and "screens" are used interchangeably herein. It should be readily apparent to one of ordinary skill in the art that the inorganic storage phosphor panel 100 depicted in FIG. 4a represents a generalized schematic illustration and that other components can be added or existing components can be removed or modified.

Figure 4B:
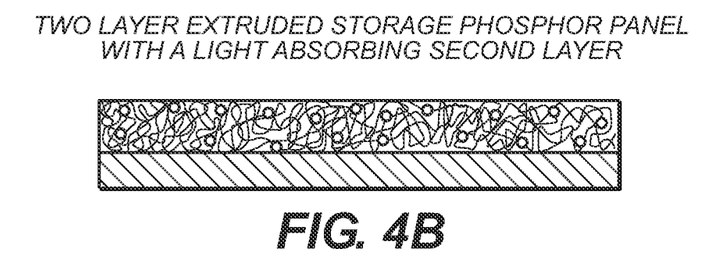

Inorganic storage phosphor panels disclosed herein can take any convenient form provided they meet all of the usual requirements for use in computed radiography. As shown in FIGS. 4a and 4b, the inorganic storage phosphor panel may or may not include a co-extruded support. In an aspect, an absorbing support layer can be co-extruded, to eliminate ambient light from reaching the inorganic storage phosphor layer. For example, in an embodiment, the light absorbing layer can comprise black dyes or carbon black and a suitable binder, such as polyethylene (e.g., LDPE).

In an aspect, an anticurl layer may be coextruded on either side of the support, if a support is used, or on side of the inorganic storage phosphor screen, to manage the dimensional stability of the inorganic storage phosphor screen.

The thickness of the support layer can vary depending on the materials used so long as it is capable of supporting itself and layers disposed thereupon. Generally, the support can have a thickness ranging from about 50 μm to about 1,000 μm, for example from about 80 μm to about 1000 μm, such as from about 80 μm to about 500 μm. The support can have a smooth or rough surface, depending on the desired application. In an embodiment, the inorganic storage phosphor panel does not comprise a support.

The inorganic storage phosphor layer can be disposed over the support, if a support is included. Alternatively, the inorganic storage phosphor layer can be extruded alone or co-extruded with an opaque layer, and anticurl layer, and combinations thereof.

The inorganic storage phosphor layer can include a thermoplastic polyolefin and an inorganic storage phosphor material. The thermoplastic polyolefin may be polyethylene, a polypropylene, and combinations thereof. In an aspect, the polyethylene can be high density poly low density polyethylene (LDPE), medium density polyethylene (MDPE), linear low density polyethylene (LLDPE), very low density polyethylene (VLDPE), and the like. In a preferred embodiment, the thermoplastic polyolefin is low density polyethylene (LDPE). The thermoplastic polyolefin can be present in the inorganic storage phosphor layer in an amount ranging from about 1% to about 50% by volume, for example from about 10% to about 30% by volume, relative to the total volume of the inorganic storage phosphor layer.

As used herein, "storage phosphor particles" and "stimulable phosphor particles" are used interchangeably and are understood to have the ordinary meaning as understood by those skilled in the art unless otherwise specified. "Storage phosphor particles" or "stimulable phosphor particles" refer to phosphor crystals capable of absorbing and storing X-rays and emitting electromagnetic radiation (e.g., light) of a second wavelength when exposed to or stimulated by radiation of still another wavelength. Generally, stimulable phosphor particles are opaque polycrystals having particle diameters of several micrometers to several hundreds of micrometers; however, fine phosphor particles of submicron to nano sizes have also been synthesized and can be useful. It is generally appreciated that sharper images can be realized with smaller mean particle sizes; however, light emission efficacy declines with decreasing particle size. Thus, the optimum mean particle size for a given application is a reflection of the balance between imaging speed and desired image sharpness.

Stimulable phosphor particles can be obtained by doping, for example, rare earth ions as an activator into a parent material such as oxides, nitrides, oxynitrides, sulfides, oxysulfides, silicates, halides, and the like, and combinations thereof. As used herein, "rare earth" refers to chemical elements having an atomic number of 39 or 57 through 71 (also known as "lanthanoids"). Stimulable phosphor particles are capable of absorbing a wide range of electromagnetic radiation. In preferred embodiments, stimulable phosphor particles can absorb radiation having a wavelength of from about 0.01 to about 10 nm (e.g., X-rays) and from about 300 nm to about 400 μm (e.g., UV, visible, and infrared light). When stimulated with stimulating light having a wavelength in the range of visible and infrared light, stimulable phosphor particles can emit stimulated light at a wavelength of from about 300 nm to about 650 nm, preferably from about 350 nm to about 450 nm.

Suitable exemplary stimulable phosphor particles for use herein include, but are not limited to, compounds having Formula (I):

$$MFX_{1-z}I_zuM^aX^a{:}yA{:}eQ{:}tD \quad \text{(I)}$$

wherein M is selected from the group consisting of Mg, Ca, Sr, Ba, and combinations thereof;
X is selected from the group consisting Cl, Br, and combinations thereof;
$M^a$ is selected from the group consisting of Na, K, Rb, Cs, and combinations thereof;
$X^a$ is selected from the group consisting of F, Cl, Br, I, and combinations thereof;
A is selected from the group consisting of Eu, Ce, Sm, Th, Bi, and combinations thereof;
Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $Nb_2O_5$, $Ta_2O_5$, $ThO_2$, and combinations thereof;
D is selected from the group consisting of V, Cr, Mn, Fe, Co, Ni, and combinations thereof;
z is from about 0.0001 to about 1;
u is from about 0 to about 1;
y is from about 0.0001 to about 0.1;
e is from 0 to about 1; and
t is from 0 to about 0.01.

The amounts represented by "z", "u", "y", "e", and "t" are molar amounts. The same designations appearing elsewhere in this disclosure have the same meanings unless otherwise specified. In Formula (I), preferably, M is Ba; X is Br; $M^a$ is selected from the group consisting of Na, K, and combinations thereof; $X^a$ is selected from the group consisting of F, Br, and combinations thereof; A is Eu; Q is selected from the group consisting of $SiO_2$, $Al_2O_3$, and combinations thereof; and t is 0.

Other exemplary stimulable phosphor particles for use herein include, but are not limited to, compounds having Formula (II):

$$(Ba_{1-a-b-c}Mg_aCa_bSr_c)FX_{1-z}I_zrM^aX^a{:}yA{:}eQ{:}tD \quad \text{(II)}$$

wherein X, $M^a$, $X^a$, A, Q, D e, t, z, and y are as defined above for Formula (I); the sum of a, b, and c, is from 0 to about 0.4; and r is from about $10^{-6}$ to about 0.1.

In Formula (II), preferably X is Br; $M^a$ is selected from the group consisting of Na, K, and combinations thereof; $X^a$ is selected from the group consisting of F, Br, and combinations thereof; A is selected from the group consisting of Eu, Ce, Bi, and combinations thereof; Q is selected from the group consisting of $SiO_2$, $Al_2O_3$, and combinations thereof; and t is 0.

Further exemplary stimulable phosphor particles for use herein include, but are not limited to, compounds having Formula (III):

$$M^{I+}X_aM^{2+}X'_2bM^{3+}X''3{:}cZ \quad \text{(III)}$$

wherein M is selected from the group consisting of Li, na, K, Cs, Rb, and combinations thereof;
$M^{2+}$ is selected from the group consisting of Be, Mg, Ca, Sr, Ba, Zn, Cd, Cu, Pb, Ni, and combinations thereof;
$M^{3+}$ is selected from the group consisting of Sc, Y, La, Ce, Pr, Nd, Pm, Sm, Eu, Gd, Tb, Dy Ho, Er, Tm Yb, Lum Al, Bi, In, Ga, and combinations thereof;
Z is selected from the group consisting of $Ga^{1+}$, $Ge^{2+}$, $Sn^{2+}$, $Sb^{3+}$, $As^{3+}$, and combinations thereof;
X, X' and X" can be the same or different and each individually represents a halogen atom selected from the group consisting of F, Br, Cl, I; and
$0 \le a \le 1$; $0 \le b \le 1$; $0 \le c \le 0.2$.

Preferred stimulable phosphor particles represented by Formulas (I), (II), or (III) include europium activated barium fluorobromides (e.g., BaFBr:Eu and BaFBrI:Eu), cerium activated alkaline earth metal halides, cerium activated oxyhalides, divalent europium activated alkaline earth metal fluorohalides, (e.g., $Ba(Sr)FBr{:}Eu^{2+}$) divalent europium activated alkaline earth metal halides, rare earth element activated rare earth oxyhalides, bismuth activated alkaline metal halide phosphors, and combinations thereof.

In embodiments, the inorganic storage phosphor material can be present in the extruded inorganic storage phosphor layer in an amount ranging from about 50% by volume to about 99% by volume, for example from about 70% by volume to about 90% by volume, relative to the volume of the extruded inorganic storage phosphor layer 120.

The thermoplastic polyolefin and the inorganic storage phosphor material are melt compounded to form composite thermoplastic particles which are then extruded to form the inorganic storage phosphor layer. For example, the composite thermoplastic particles can be prepared by melt compounding the thermoplastic polyolefin with the inorganic storage phosphor material using a twin screw compounder. The ratio of thermoplastic polyolefin to inorganic storage phosphor material (polyolefin:inorganic storage phosphor) can range from about 1:100 to about 1:0.01, by weight or volume, preferably from about 1:1 to about 1:–0.1, by weight or volume. During melt compounding, the thermoplastic olefin and the inorganic storage phosphor material can be compounded and heated through ten heating zones. For example, the first heating zone can have a temperature ranging from about 175° C. to about 180° C.; the second heating zone can have a temperature ranging from about 185° C. to about 190° C.; the third heating zone can have a temperature ranging from about 195° C. to about 200° C.; the fourth heating zone can have a temperature ranging from about 195° C. to about 200° C.; the fifth heating zone can have a temperature ranging from about 185° C. to about 190° C.; the sixth heating zone can have a temperature ranging from about 185° C. to about 190° C.; the seventh heating zone can have a temperature ranging from about 185° C. to about 190° C.; the eighth heating zone can have a temperature ranging from about 185° C. to about 190° C.; the ninth heating zone can have a temperature ranging from about 180° C. to about 175° C.; and the tenth heating zone can have a temperature ranging from about 175° C. to about 170° C. The period of time in each zone depends on the polymer used. Generally, the polymer can be heated for a time and temperature sufficient to melt the polymer and incorporate the inorganic storage phosphor material without decomposing the polymer. The period of time in each zone can range from about 0.1 minutes to about 30 minutes, for example from about 1 minute to about 10 minutes. Upon exiting the melt compounder, the composite thermoplastic material can enter a water bath to cool and harden into continuous strands. The strands can be pelletized and dried at about 40° C. The screw speed and feed rates for each of the thermoplastic polyolefin 130 and the inorganic storage phosphor material 140 can be adjusted as desired to control the amount of each in the composite thermoplastic material.

The composite thermoplastic material can be extruded to form the inorganic storage phosphor layer in which the inorganic storage phosphor material is intercalated ("loaded") within the thermoplastic polyolefin. For example, the inorganic storage phosphor layer can be formed by melt extruding the composite thermoplastic material. Without being limited by theory, it is believed that forming the inorganic storage phosphor layer by extrusion increases the homogeneity of the inorganic storage phosphor layer, and eliminates the undesirable "evaporated space" generated when the solvent is evaporated in the traditional solvent-coated panels. An extruded inorganic storage phosphor panel according to the present disclosure can have comparable image quality, as compared to the traditional solvent coated panels, along with improved mechanical and environmental robustness.

In a preferred embodiment, the inorganic storage phosphor layer is co-extruded with an opaque layer, without a substrate. The screw speed and pump speed of the melt extruder can be adjusted to control the thickness for each of the inorganic storage phosphor layer and the opaque layer, individually.

The thickness of the inorganic storage phosphor layer can range from about 10 µm to about 1000 µm, preferably from about 50 µm to about 750 µm, more preferably from about 100 µm to about 500 µm.

Optionally, the extruded inorganic storage phosphor panel can include a protective overcoat disposed over the inorganic storage phosphor layer, that provide enhanced mechanical strength and scratch and moisture resistance, if desired. However, inclusion of a protective layer on the extruded inorganic storage phosphor panel can negatively impact the image quality.

The DQE of the storage phosphor panels were estimated using procedures well known in the art (Fujita H., Tsai D. Y., Itoh T., Doi K., Morishita J., Ueda K., Ohtsuka A., A Simple Method for Determining the Modulation Transfer function in Digital Radiography, IEEE Trans. Med. Imaging, 1992, 11, 34, Williams, M. B., Simoni P. U., Smilowitz, L., Stanton, M., Phillips, W., Stewart A., Analysis of the Detective Quantum Efficiency of a Development Detector for Digital Mammography, Medical Physics, 1999, 26, 2273). The modulation transfer functions (MTF) of the panels were calculated by analyzing the slit images acquired using specific x-ray beam conditions in the laboratory, and the noise power spectra (NPS) were calculated from the flat field images acquired at various exposure levels, and the DQE was estimated by combining the MTF, NPS and the input signal to noise ratio (SNR) calculated for the corresponding exposure levels of the x-ray beam.

Inventive Example

Composite Thermoplastic Particle Production

Composite thermoplastic particles according to the present disclosure were prepared comprising 80 wt. % barium fluorobromoiodide (BFBrI) and 20 wt. % low density polyethylene (LDPE 811A, available from Westlake Chemical Corp. of Houston, Tex.). The BFBrI powder was loaded into Feeder 2 and the LDPE was loaded into Feeder 4 of a Leistritz twin screw compounder. The die temperature was set to 200° C. and 10 heating zones within the compounder were set to the temperatures shown in Table 6 below:

TABLE 6

| Zone | 1 | 2 | 3 | 4 | 5 | 6 | 7 | 8 | 9 | 10 |
|---|---|---|---|---|---|---|---|---|---|---|
| Temp (° C.) | 180 | 190 | 200 | 200 | 190 | 190 | 190 | 190 | 175 | 170 |

The screw speed was 300 RPM, and the BFBrI powder and LDPE were gravity fed into the screw compounder. After exiting the die, the composite thermoplastic particles, comprising LDPE loaded with BFBrI, entered a 25° C. water bath to cool and hardened into continuous strands. The strands were then pelletized in a pelletizer and dried at 40° C.

Extrusion of Inorganic Storage Phosphor Layer

The pelletized composite thermoplastic materials were loaded into a single screw Killion extruder. Within the extruder, heating zones were set to the temperatures shown in Tables 7:

TABLE 7

| Killion Extruder | |
| --- | --- |
| Zone | Temp |
| 1 | 350° F. |
| 2 | 380° F. |
| 3 | 400° F. |
| 4 | 400° F. |
| Gate | 400° F. |
| Adapter | 400° F. |
| Poly line | 400° F. |
| Melt pump | 400° F. |

The pelletized material (composite thermoplastic) was extruded through a single die with the die temperature set at 400° F. form an extruded inorganic storage phosphor panel. The screw speed, feed rates, and layer thicknesses are described in Table 8 below.

TABLE 8

| | Screw Speed (RPM) | Feed Rate | Inorganic storage phosphor layer thickness (micron) |
| --- | --- | --- | --- |
| Inventive Panel 1 | 300 | gravity | 225 |

Comparative Example

A solvent coated storage phosphor panel (CS7400 Imaging Plate from Carestream Dental) with equivalent x-ray absorbance as the extruded storage phosphor panel, was used for comparison.

Figure 5:
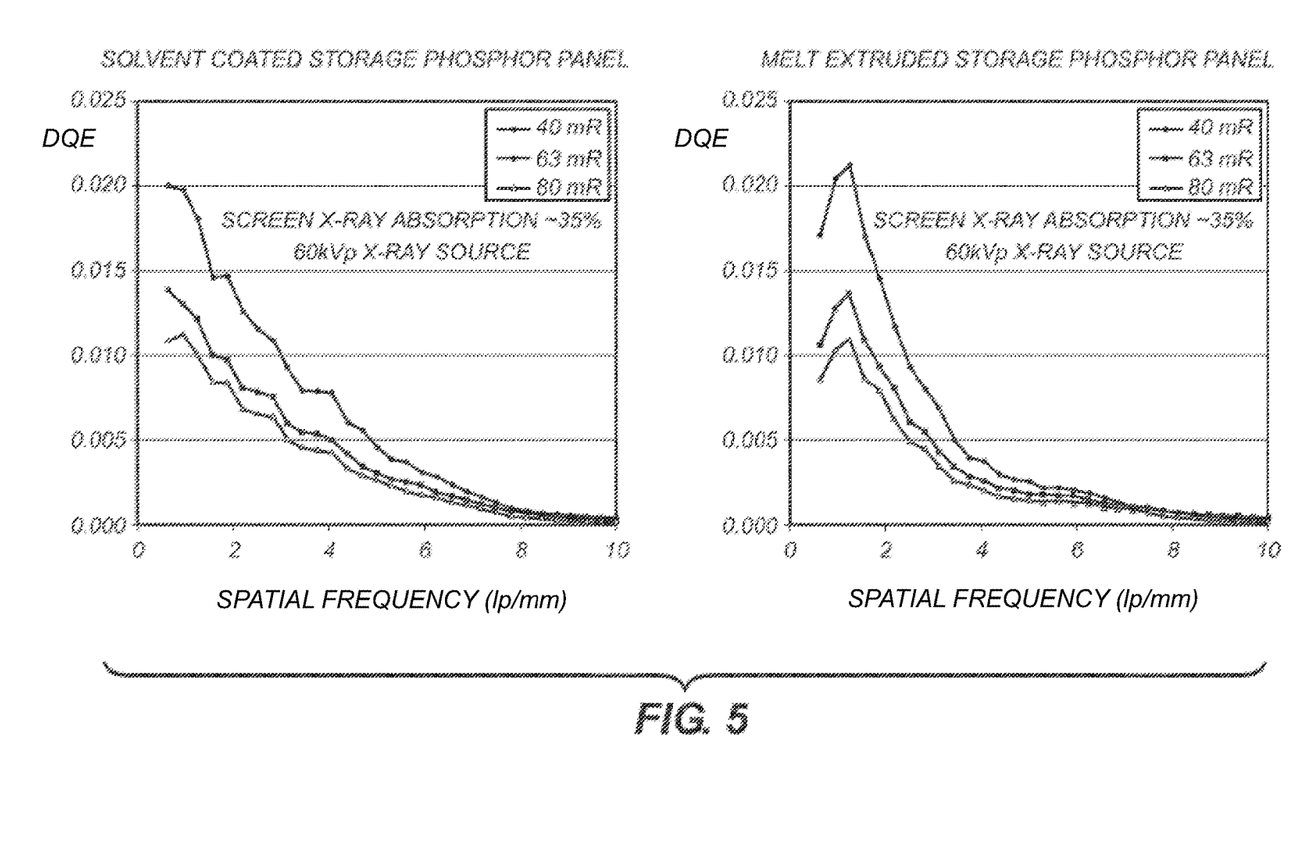
FIG. 5 compares the DQE of an inorganic storage phosphor panel in accordance with various embodiments of the present disclosure versus comparative inorganic storage phosphor panels in the art.

FIG. 5 shows that the DQE of the melt extruded storage phosphor screen is comparable to the DQE of the traditional solvent coated screen. Further, the melt extruded storage phosphor screen remained transparent and did not suffer discoloration.

While the invention has been illustrated with respect to one or more implementations, alterations and/or modifications can be made to the illustrated examples without departing from the spirit and scope of the appended claims. In addition, while a particular feature of the invention can have been disclosed with respect to only one of several implementations/embodiments, such feature can be combined with one or more other features of the other implementations/embodiments as can be desired and advantageous for any given or particular function. The term "at least one of" is used to mean one or more of the listed items can be selected. The term "about" indicates that the value listed can be somewhat altered, as long as the alteration does not result in nonconformance of the process or structure to the illustrated embodiment. Finally, "exemplary" indicates the description is used as an example, rather than implying that it is an ideal. Other embodiments of the invention will be apparent to those skilled in the art from consideration of the specification and practice of the invention disclosed herein. It is intended that the specification and examples be considered as exemplary only, with a true scope and spirit of the invention being indicated by at least the following claims.

What is claimed is:

1. An extruded inorganic storage phosphor panel comprising:
    an extruded inorganic storage phosphor layer comprising a thermoplastic polyolefin and an inorganic storage phosphor material, where the extruded inorganic storage phosphor layer does not include a support and requires irradiation with a longer wavelength radiation, subsequent to x-ray exposure, for stimulated emission of light for detection, wherein the extruded inorganic storage phosphor panel has a detection quantum efficiency (DQE) that is within 10% of a solvent coated inorganic storage phosphor screen having similar x-ray absorbance at a spatial frequency of 6 line pairs/millimeter (lp/mm) or 8 lp/mm, where the storage phosphor used in the extruded inorganic storage phosphor panel and the solvent coated inorganic storage phosphor screen are the same.

2. The extruded inorganic storage phosphor panel of claim 1, wherein the thermoplastic olefin comprises low density polyethylene.

3. The extruded inorganic storage phosphor panel of claim 1, wherein the inorganic storage phosphor material comprises stimulable phosphor particles including europium activated barium fluorobromides, cerium activated alkaline earth metal halides, cerium activated oxyhalides, divalent europium activated alkaline earth metal fluorohalides, divalent europium activated alkaline earth metal halides, rare earth element activated rare earth oxyhalides, bismuth activated alkaline metal halide phosphors, and combinations thereof.

4. The extruded inorganic storage phosphor panel of claim 1, wherein the inorganic storage phosphor material is present in the extruded inorganic storage phosphor layer in an amount ranging from about 50% by volume to about 99% by volume, relative to the volume of the extruded inorganic storage phosphor layer.

5. The extruded inorganic storage phosphor panel of claim 1, wherein the inorganic storage phosphor material is present in the extruded inorganic storage phosphor layer in an amount ranging from about 70% by volume to about 90% by volume, relative to the volume of the extruded inorganic storage phosphor layer.

6. The extruded inorganic storage phosphor panel of claim 1, further comprising an extruded opaque layer comprising carbon black.

7. The extruded inorganic storage phosphor panel of claim 1, wherein the extruded inorganic storage phosphor layer comprises a thickness ranging from about 25 µm to about 1000 µm.

8. An inorganic storage phosphor detection system comprising:
    an extruded inorganic storage phosphor panel comprising an extruded inorganic storage phosphor layer comprising a thermoplastic polyolefin and an inorganic storage phosphor material, where the extruded inorganic storage phosphor layer does not include a support and requires irradiation with a longer wavelength radiation, subsequent to x-ray exposure, for stimulated emission of light for detection, where the extruded inorganic storage phosphor panel has a detection quantum efficiency (DQE) that is within 10% of a solvent coated inorganic storage phosphor screen having similar x-ray absorbance at a spatial frequency of 6 line lp/mm or 8 lp/mm, where the storage phosphor used in the extruded inorganic storage phosphor panel and the solvent coated inorganic storage phosphor screen are the same; and at least one photodetector coupled to the extruded inorganic storage phosphor panel, wherein at least one photodetector is configured to detect photons generated from the extruded inorganic storage phosphor panel.

9. The inorganic storage phosphor detection system of claim 8, wherein the thermoplastic polyolefin comprises low density polyethylene and the inorganic storage phosphor material comprises stimulable phosphor particles including europium activated barium fluorobromides, cerium activated alkaline earth metal halides, cerium activated oxyhalides, divalent europium activated alkaline earth metal fluorohalides, divalent europium activated alkaline earth metal halides, rare earth element activated rare earth oxyhalides, bismuth activated alkaline metal halide phosphors, and combinations thereof.

10. The inorganic storage phosphor detection system of claim 8, wherein the inorganic storage phosphor material is present in the extruded inorganic storage phosphor layer in an amount ranging from about 50% by volume to about 99% by volume, relative to the volume of the extruded layer.

11. The inorganic storage phosphor detection system of claim 8, wherein the extruded inorganic storage phosphor panel further comprises an extruded opaque layer comprising carbon black.

12. The inorganic storage phosphor detection system of claim 8, wherein the extruded inorganic storage phosphor layer comprises a thickness ranging from about 25 μm to about 1000 μm.

13. The inorganic storage phosphor detection system of claim 8, wherein the at least one photodetector comprises at least one of photomultiplier tubes, photodiodes, phototransistors, charge coupled array devices, and combinations thereof.

14. A method of making an extruded inorganic storage phosphor panel comprising:

providing thermoplastic particles comprising at least one thermoplastic polyolefin and an inorganic storage phosphor material, where the inorganic storage phosphor material requires irradiation with a longer wavelength radiation, subsequent to x-ray exposure, for stimulated emission of light for detection; and melt extruding the thermoplastic particles to form an extruded inorganic storage phosphor layer, where the extruded inorganic storage phosphor panel has a detection quantum efficiency (DQE) that is within 10% of a solvent coated inorganic storage phosphor screen having similar x-ray absorbance at a spatial frequency of 6 line lp/mm or 8 lp/mm, where the storage phosphor used in the extruded inorganic storage phosphor panel and the solvent coated inorganic storage phosphor screen are the same.

15. The method of claim 14, wherein the thermoplastic particles are formed by melt compounding the thermoplastic polyolefin and the inorganic storage phosphor material through a plurality of heating zones for a period of time in each zone.

16. The method of claim 15, wherein the period of time in each zone ranges from about 0.01 min to about 30 min.

* * * * *